US008483038B2

(12) United States Patent
Fujii et al.

(10) Patent No.: US 8,483,038 B2
(45) Date of Patent: Jul. 9, 2013

(54) RADIO COMMUNICATION APPARATUS AND RADIO COMMUNICATION METHOD

(75) Inventors: Hiromasa Fujii, Yokosuka (JP); Hitoshi Yoshino, Yokosuka (JP); Junichiro Hagiwara, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 749 days.

(21) Appl. No.: 11/987,717

(22) Filed: Dec. 4, 2007

(65) Prior Publication Data

US 2008/0130481 A1 Jun. 5, 2008

(30) Foreign Application Priority Data

Dec. 4, 2006 (JP) ................................ P2006-327203
Oct. 31, 2007 (JP) ................................ P2007-284021

(51) Int. Cl.
*H04J 11/00* (2006.01)

(52) U.S. Cl.
USPC ......................................................... 370/203

(58) Field of Classification Search
USPC .................................. 370/329, 208, 315, 330
See application file for complete search history.

(56) References Cited

U.S. PATENT DOCUMENTS

| 7,573,851 | B2 * | 8/2009 | Xing et al. ..................... 370/334 |
| 2005/0048979 | A1 | 3/2005 | Chun et al. |
| 2006/0009224 | A1 | 1/2006 | Lim et al. |
| 2006/0193280 | A1 * | 8/2006 | Lee et al. ....................... 370/315 |
| 2006/0212133 | A1 * | 9/2006 | Damnjanovic et al. ........... 700/1 |
| 2007/0077934 | A1 | 4/2007 | Chindapol et al. |
| 2008/0037672 | A1 * | 2/2008 | Yun et al. ........................ 375/260 |
| 2008/0089278 | A1 * | 4/2008 | Chang et al. ................... 370/329 |
| 2009/0047971 | A1 * | 2/2009 | Fu .................................. 455/450 |

FOREIGN PATENT DOCUMENTS

| JP | 2004-159345 | 6/2004 |
| JP | 2005-80286 | 3/2005 |
| JP | 2006-141038 | 6/2006 |
| WO | WO 2005/046283 A1 | 5/2005 |
| WO | WO 2006/020032 A1 | 2/2006 |
| WO | WO 2006/086788 A1 | 8/2006 |

OTHER PUBLICATIONS

Mobile Communications Second Edition by John Schiller ISBN 0 321 12381 6, pp. 61-64.*
Office Action issued Sep. 22, 2011, in European Patent Application No. 07 023 441.4.
Notice of Grounds for Rejection issued May 15, 2012 in Japanese Patent Application No. 2007-284021 (with English translation).

(Continued)

*Primary Examiner* — Mark Rinehart
*Assistant Examiner* — Mohammad Anwar
(74) *Attorney, Agent, or Firm* — Oblon, Spivak, McClelland, Maier & Neustadt, L.L.P.

(57) ABSTRACT

The present invention is to provide a communication channel with a low inter-cell interference while suppressing variation in the amount of inter-cell interference. Provided is a base station arranged in a radio communication system configured to implement a frequency division multiple access method by using a frequency division multiplexing method as a modulation method, and configured of cells each divided into an inner region and an outer region. The base station includes an allocation controller configured to perform subchannelization using a perfectly-orthogonal channel in the outer region of the cell, and to perform subchannelization using a quasi-orthogonal channel in the inner region of the cell.

11 Claims, 12 Drawing Sheets

OTHER PUBLICATIONS

Extended European Search Report issued Dec. 3, 2010, in Patent Application No. 07023441.4.

Joo Heo, et al., "A Novel Transmit Power Allocation Algorithm Combined with Dynamic Channel Allocation in Reuse Partitioning-based OFDMA/FDD System", IEEE Communications Society, XP 31025818, Jun. 1, 2006, pp. 5654-5659.

Aik Chindapol, et al., "Distributed Dynamic Resource Allocation for OFDMA Transmissions with Reuse Partitioning", Sarnoff Symposium, XP 31266856, Mar. 27, 2006, pp. 1-4.

Peter H. J. Chong, et al., "Performance Analysis of Reuse Partitioning in Cellular Systems", Communications, Computers and Signal Processing, XP 10356657, Aug. 22, 1999, pp. 213-216.

* cited by examiner

PERFECTLY-ORTHOGONAL CHANNEL

QUASI-ORTHOGONAL CHANNEL

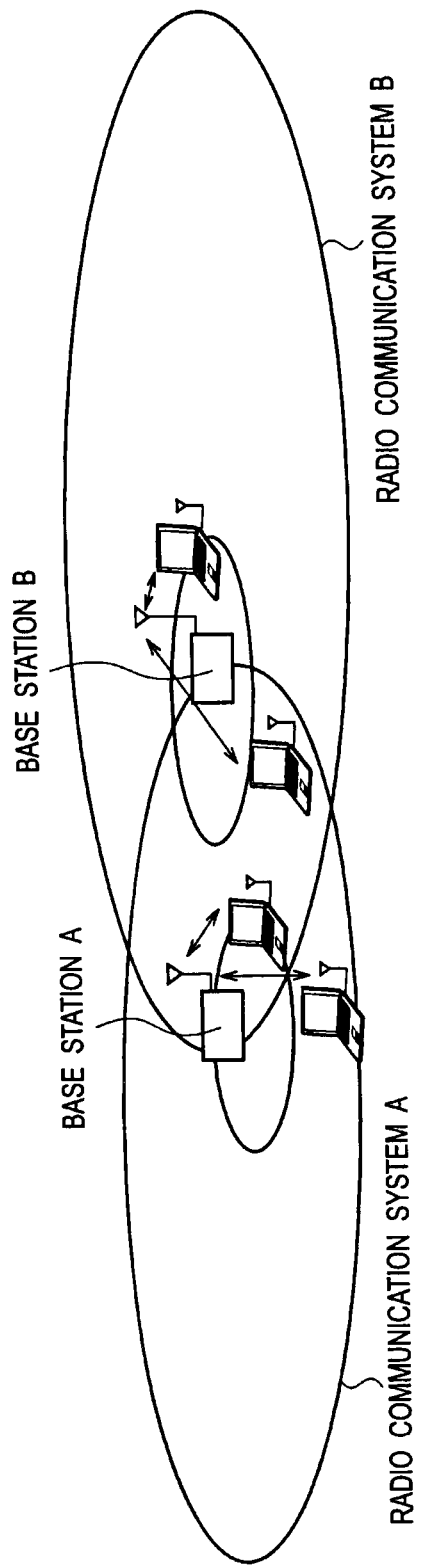

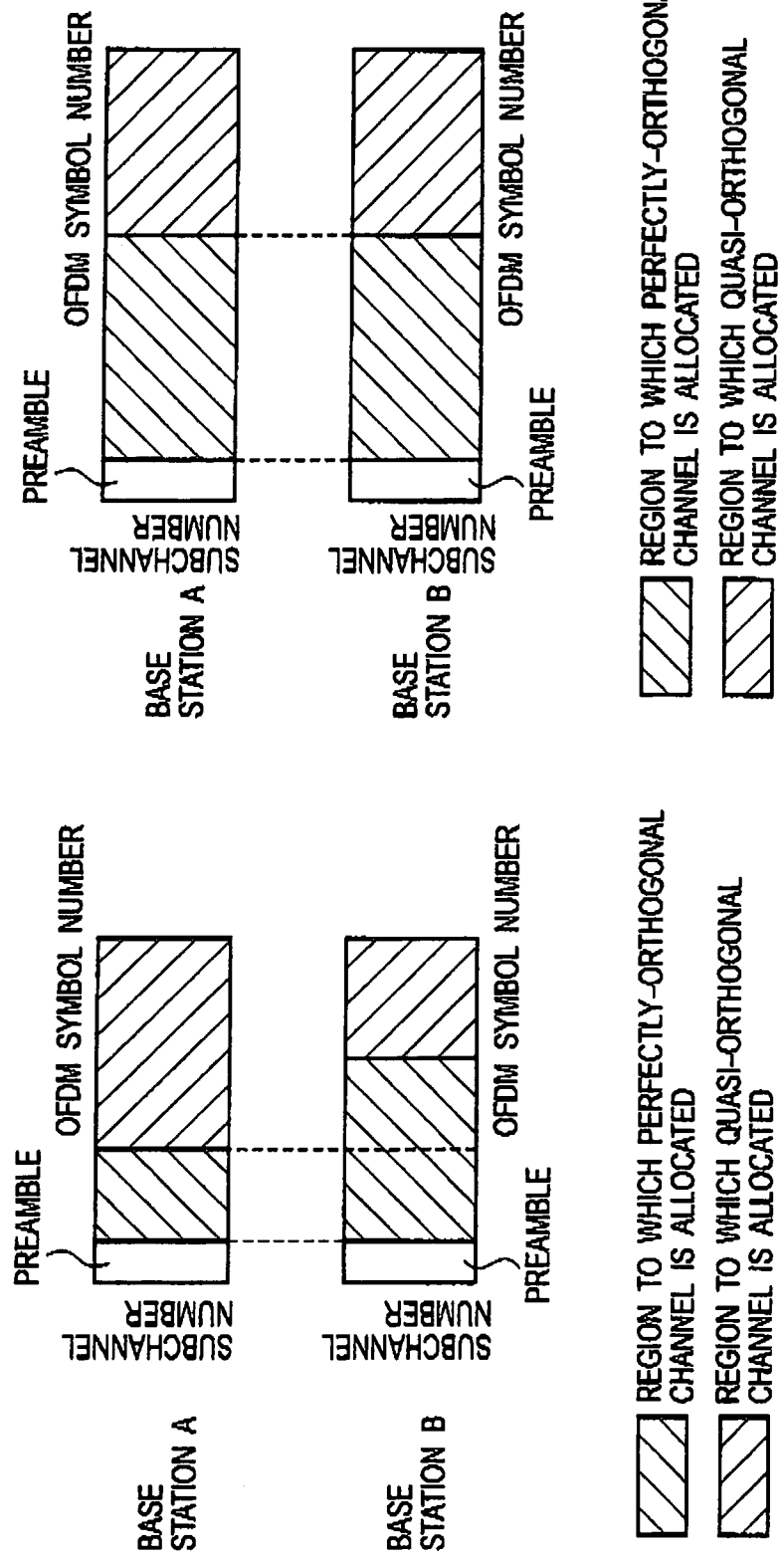

RADIO COMMUNICATION APPARATUS AND RADIO COMMUNICATION METHOD

CROSS REFERENCE TO RELATED APPLICATIONS

This application is based upon and claims the benefit of priority from prior Japanese Patent Application No. 2006-327203 filed Dec. 4, 2006, and 2007-284021 filed on Oct. 31, 2007; the entire contents of which are incorporated by reference.

BACKGROUND OF THE INVENTION

1. Field of the Invention

The present invention relates to a radio communication apparatus and a radio communication method.

2. Description of the Related Art

A radio communication system using a FDMA (frequency division multiple access) method or the like has been conventionally known. In particular, a radio communication system using an OFDMA (orthogonal frequency division multiple access) method or the like has recently attracted attention.

In a case where there are three adjacent cells 1 to 3 in a radio communication system using the orthogonal frequency division multiple access method, the following two configurations have been known, for example. In the first configuration, the same frequency band (f MHz) is used in each of the cells 1 to 3 (see FIG. 1). On the other hand, in the second configuration, a certain frequency band (f MHz) is divided into three frequency bands (f/3 MHz), and then the divided frequency bands (f/3 MHz) are allocated respectively to the cells 1 to 3 (see FIG. 2).

In the first configuration (see FIG. 1), the whole of a certain frequency band is used by a plurality of cells (here, the cells 1 to 3). Accordingly, when interference from other cells is small, a high peak throughput can be achieved. However, since the same frequency band is used also in the adjacent cells, the inter-cell interference becomes large. As a result, a sufficient communication quality (transmission rate, call loss probability, etc) cannot be provided to a mobile terminal (user) located at the edge of the cell.

On the other hand, in the second configuration (see FIG. 2), different frequency bands are used respectively in adjacent cells (here, the cells 1 to 3). Accordingly, inter-cell interference can be easily suppressed. However, since a certain frequency band is divided into three frequency bands, the maximum peak throughput is one third of the peak throughput of a cell using the whole of the frequency band. As a result, there is a problem that radio resources cannot be sufficiently utilized when traffic is not uniform among the cells.

Consequently, the following configuration has been proposed (see Japanese Patent Application Publication No. 2005-80286). In this configuration, cells are each divided into an outer region and an inner region as shown in FIG. 3. Then, a frequency band F4 that is commonly used in plural cells is allocated to the inner regions where interference from other cells is small. On the other hand, frequency bands F1 to F3 that are separately used in the respective cells are allocated to the corresponding outer regions where interference from other cells is large.

The above-described conventional techniques are aimed at audio communications in which time variation in inter-cell interference is relatively small.

By contrast, data communications have the characteristic that the variation in interference to the surrounding environment is large due to the feature of traffic of the data communications in which short packets are intermittently transmitted, particularly in a point-to-point link.

On the other hand, the data communications also has the characteristic that retransmission processing can be performed. However, since the transmission power and MCS (modulation coding sets) are determined based on the interference level estimated prior to transmitting the data, there is a problem that a condition with a large variation in the amount of interference is not favorable.

Moreover, in a case where the OFDMA method is supposed to be used, it is possible to implement both of a "perfectly-orthogonal channel (described later)" and a "quasi-orthogonal channel (also described later)" within the same frequency band of the same radio communication system, while it is impossible in the case of the FDMA method.

SUMMARY OF THE INVENTION

The present invention has been made in view of the above problems, and its object is to provide a radio communication apparatus and a radio communication method that make it possible to provide communications with a small inter-cell interference and suppress variation in inter-cell interference.

A first aspect of the present invention is summarized as a radio communication apparatus used in a radio communication system configured to implement a frequency division multiple access method by using a frequency division multiplexing method as a modulation method and to divide each cell into at least one inner region and an outer region, the radio communication apparatus comprising, an allocation controller configured to allocate a perfectly-orthogonal channel as a subchannel available in the outer region, and to allocate a quasi-orthogonal channel as a subchannel available in the inner region, wherein a perfectly-orthogonal channel allocated as a subchannel available in an outer region of a specific cell is configured not to include any subcarriers included in a perfectly-orthogonal channel allocated as a subchannel available in an outer region of another cell adjacent to the specific cell, and a quasi-orthogonal channel allocated as a subchannel available in an inner region of the specific cell is configured to include some of subcarriers included in a quasi-orthogonal channel allocated as a subchannel available in an inner region of another cell adjacent to the specific cell.

In the first aspect of the present invention, the allocation controller may be configured to allocate the subchannel available in the outer region to a mobile terminal having a lower reception power of a desired wave than a predetermined threshold, and to allocate the subchannel available in the inner region to a mobile terminal having a higher reception power of the desired wave than the predetermined threshold.

In the first aspect of the present invention, the each cell may be divided into a plurality of inner regions and the outer region, and the allocation controller is configured to allocate quasi-orthogonal channels having different usage rates as subchannels which are available respectively in the plurality of inner regions.

In the first aspect of the present invention, the allocation controller may be configured to allocate a radio resource to a mobile terminal located in the outer region of the each cell by using a burst allocation pattern defined by a combination of at least one perfectly-orthogonal channel and at least one symbol in a data frame structure, and the burst allocation pattern is identical in the each cell.

In the first aspect of the present invention, the allocation controller may be configured to allocate a handover call to the subchannel available in the outer region.

In the first aspect of the present invention, the each cell may be divided into a plurality of inner regions and the outer region, and the allocation controller is configured to allocate a handover call to a subchannel available in one of the plurality of inner regions.

In the first aspect of the present invention, the allocation controller may be configured to allocate the handover call to a region in a data frame structure, the region being close to a preamble region to which a preamble is allocated.

In the first aspect of the present invention, the allocation controller may be configured to allocate the subchannel available in either the inner region or the outer region to a mobile terminal, in accordance with a communication quality in the down link, the communication quality being notified by the mobile terminal.

In the first aspect of the present invention, the allocation controller may be configured to allocate a radio resource to a mobile terminal located in the outer region of the each cell by using a burst allocation pattern defined by a combination of at least one perfectly-orthogonal channel and at least one symbol in a data frame structure, and the allocation controller is configured to change the burst allocation pattern in accordance with a propagation condition.

In the first aspect of the present invention, the allocation controller may be configured to allocate at least one broadcast signal to a subchannel available in the outer region.

In the first aspect of the present invention, the allocation controller may be configured to exclusively allocate some of subchannels available in the outer region for transmitting a broadcast signal.

A second aspect of the present invention is summarized as a radio communication method in a radio communication system configured to implement a frequency division multiple access method by using a frequency division multiplexing method as a modulation method, and to divide each cell into at least one inner region and an outer region, the radio communication method comprising, allocating, at a radio communication apparatus, a perfectly-orthogonal channel as a subchannel available in the outer region, and allocating a quasi-orthogonal channel as a subchannel available in the inner region, wherein a perfectly-orgthogonal channel allocated as a subchannel available in an outer region of a specific cell is configure not to include any subcarriers included in a perfectly-orthogonal channel allocated as a subchannel available in an outer region of another cell adjacent to the specific cell, and a quasi-orthogonal channel allocated as a subchannel available in an inner region of the specific cell is configured to include some of subcarriers included in a quasi-orthogonal channel allocated as a subchannel available in an inner region of another cell adjacent to the specific cell.

BRIEF DESCRIPTION OF THE DRAWINGS

FIG. 17 is a diagram showing the overall configuration of radio communication systems according to the seventh and eighth embodiment.

FIG. 18A is a diagram for explaining examples of data frame structures used in the radio communication system according to the seventh embodiment.

FIG. 18B is another diagram for explaining examples of data frame structures used in the radio communication system according to the seventh embodiment.

DETAILED DESCRIPTION OF THE EMBODIMENTS

Figure 1:
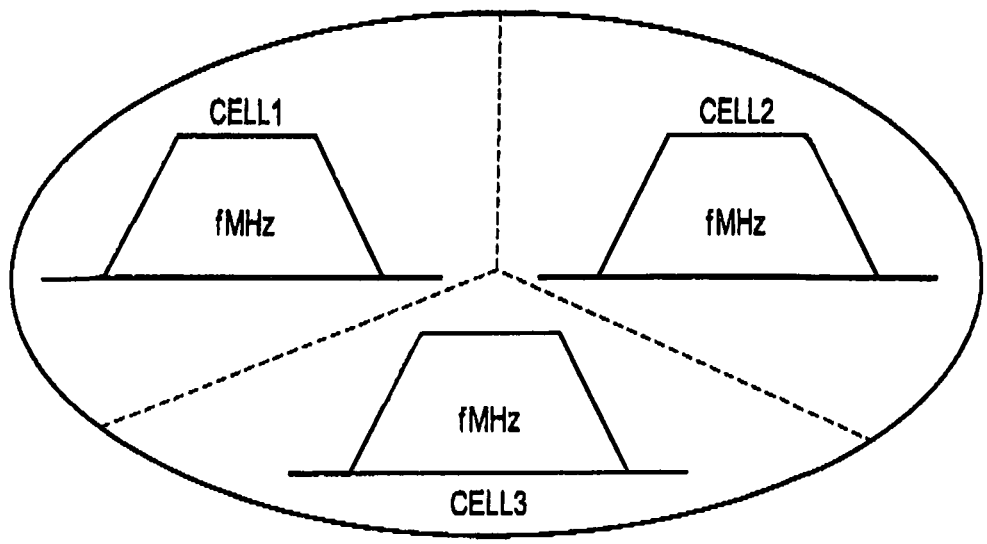
FIG. 1 is a diagram for explaining a first conventional method of allocating frequency bands.
Figure 2:
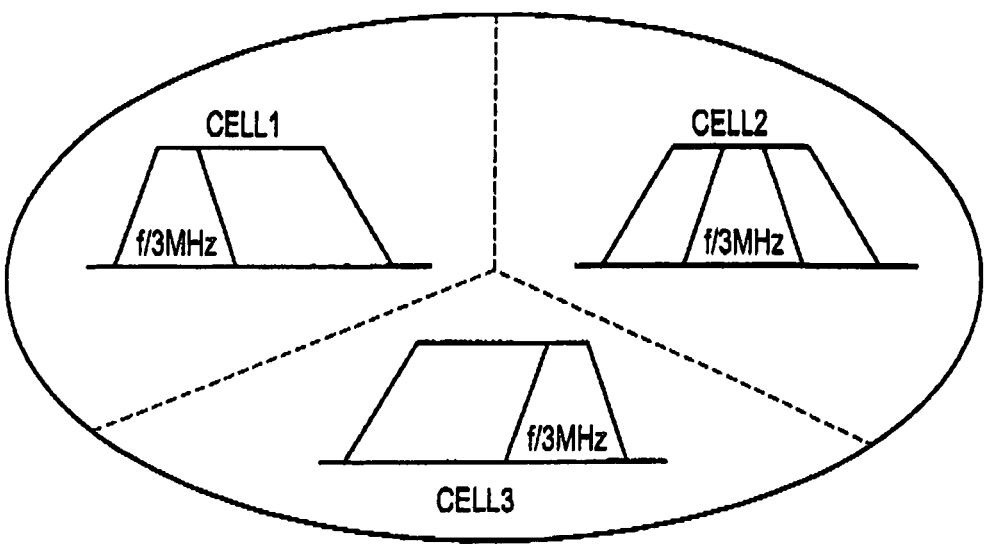
FIG. 2 is a diagram for explaining a second conventional method of allocating frequency bands.

Hereinafter, embodiments of the present invention will be described with reference to the accompanying drawings. In the following descriptions of the drawings, the same or similar reference numerals and symbols are attached to the same or similar elements. However, it should be kept in mind that the drawings are only schematic.

Radio Communication System According to First Embodiment of the Present Invention A radio communication system according to a first embodiment of the present invention is a multi-user communication system using an orthogonal frequency division multiplexing (OFDM) method as a multiplexing method.

In the radio communication system according to this embodiment, part of a plurality of subcarriers included in a single communication path is allocated to a single mobile station (user), which is known as an orthogonal frequency division multiple access (OFDMA).

Figure 3:
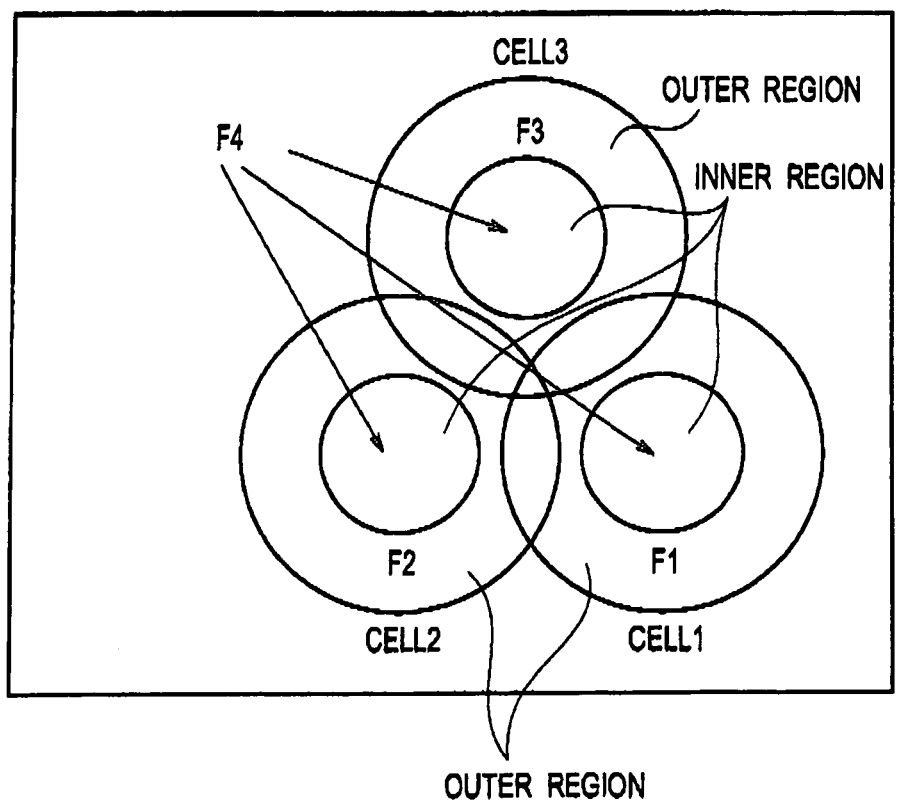
FIG. 3 is a diagram for explaining a third conventional method of allocating frequency bands.

In addition, in the radio communication system according to this embodiment, a cell is divided into an inner region and an outer region, as shown in FIG. 3.

In the inner region, used is a frequency band (indicated by F4 in the example shown in FIG. 3) that is the same as frequencies used respectively in the inner regions of adjacent cells. On the other hand, in the outer region, used is a frequency band (indicated by, F1 in the outer region of a cell 1, F2 in the outer region of a cell 2, and F3 in the outer region of a cell 3) that does not overlap with frequencies used respectively in the outer regions of the adjacent cells.

Moreover, in the radio communication system according to this embodiment, a base station (radio communication apparatus) is configured to allocate, to each of a plurality of mobile terminals, a subchannel available in either the outer region or the inner region of a cell covered by the base station.

In this embodiment, to make it easier to understand, a description will be given of an example of a case where subchannels are orthogonal in the frequency direction. However, the present invention is not limited to this example, and may be applied to a case where subchannels are orthogonal in the time direction, as well as to a case where subchannels are orthogonal in both of the time and frequency directions in combination.

Figure 4:
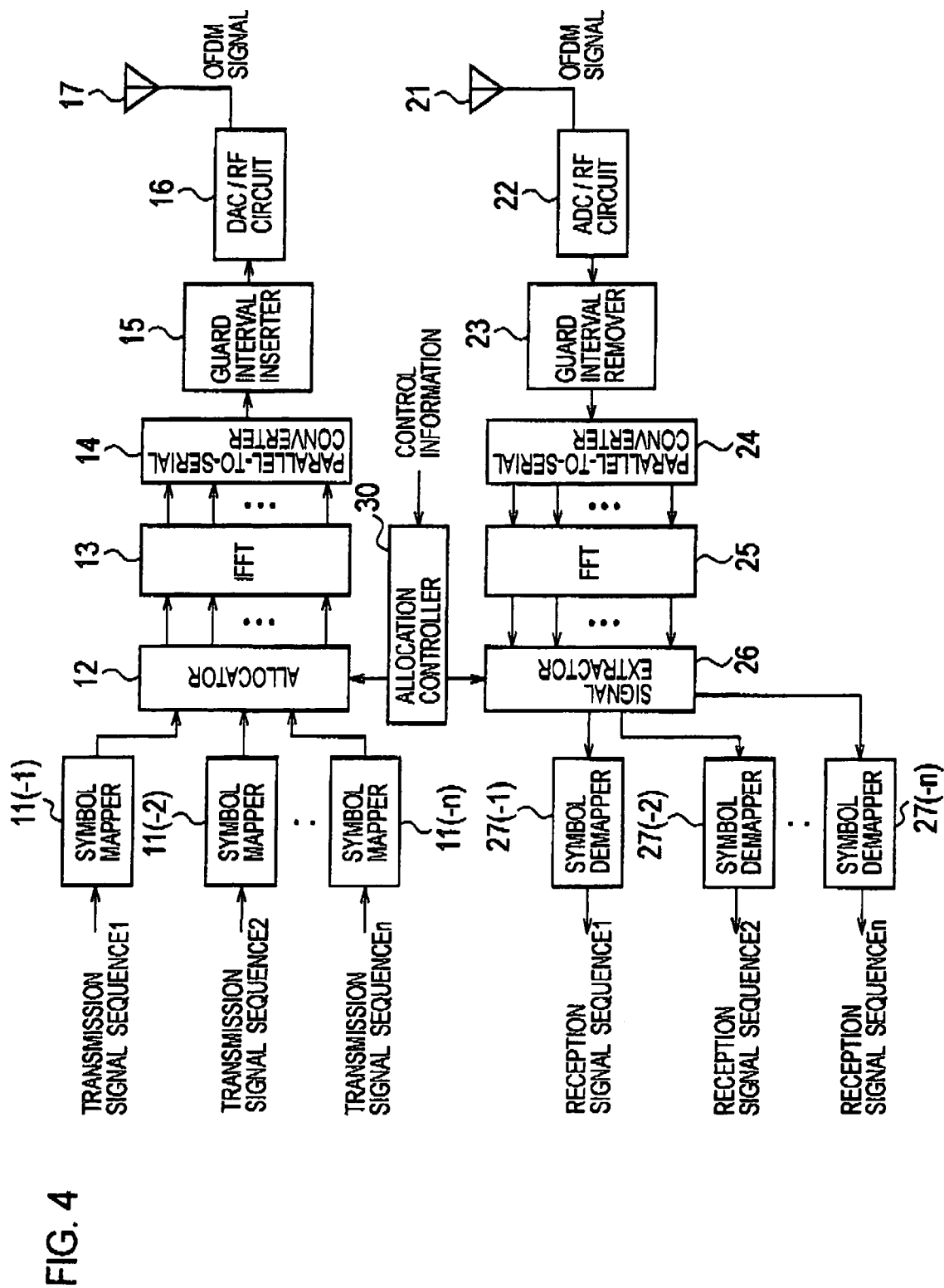
FIG. 4 is a functional block diagram of a base station according to first to ninth embodiments.

The base station in the radio communication system according to this embodiment includes, as shown in FIG. 4, symbol mappers 11, an allocator 12, an IFFT 13, a parallel-to-serial converter 14, a guard interval inserter 15, a DAC/RF circuit 16, antennas 17 and 21, an ADC/RF circuit 22, a guard interval remover 23, a parallel-to-serial converter 24, an FFT 25, a signal extractor 26, symbol demappers 27, and an allocation controller 30.

Each of the symbol mappers 11 is configured to map a input transmission signal sequence (a bit sequence) into symbols in accordance with an applied modulation method, and to then output the transmission signal mapped into the symbols to the allocator 12.

The allocator 12 is configured to allocate, in accordance with instructions from the allocation controller 30, the inputted transmission signal sequences to subcarriers included (arranged on the frequency axis) in a "perfectly-orthogonal channel" or a "quasi-orthogonal channel." The allocator 12 then is configured to output a symbol to each of the port corresponding to a subcarrier.

The IFFT 13 is configured to obtain time signals (digital signals) by applying Inverse Fourier Transform to the symbols inputted from the allocator 12 as described above, and to then output the obtained time signals.

The parallel-to-serial converter 14 is configured to perform parallel-to-serial conversion on the time signals (digital signals) obtained by the Inverse Fourier Transform.

The guard interval inserter 15 is configured to insert guard intervals into the time signals (digital signals) inputted from the parallel-to-serial converter 14.

The DAC/RF circuit 16 is configured to obtain OFDM signals (analog signals), and to then transmit the obtained OFDM signals through the antenna 17. Here, the DAC/RF circuit 16 obtains the OFDM signals by converting, into analog signals, the time signals (digital signals) which the guard intervals has been inserted into, and by then performing necessary analog processing, such as amplification and frequency conversion.

On the other hand, when the antenna 21 receives OFDM signals (analog signals), the ADC/RF circuit 22 is configured to perform necessary analog processing, such as amplification and frequency conversion, on the received OFDM signals (analog signals), and to then convert the OFDM signals into digital signals.

The guard interval remover 23 is configured to remove the guard intervals from the digital signals inputted from the ADC/RF circuit 22.

The parallel-to-serial converter 24 is configured to perform parallel-to-serial conversion on the digital signals from which the guard intervals have been removed.

The FFT 25 is configured to perform Fourier Transform on the digital signals inputted from the parallel-to-serial converter 24, and to thus obtain symbols on the subcarriers.

The signal extractor 26 is configured to extract, in accordance with instructions from the allocation controller 30, required symbols from the symbols inputted from the FFT 25.

The symbol demapper 27 is configured to perform demapping symbols extracted by the signal extractor 26, and to thus obtain a reception signal sequence.

The allocation controller 30 is configured to allocate the "perfectly-orthogonal channel" as a subchannel available in the outer region of the cell, and also to allocate the "quasi-orthogonal channel" as a subchannel available in the inner region of the cell.

In other words, the allocation controller 30 is configured to control a method of subchannelization in accordance with whether the mobile terminal with which the base station is to communicate is located in the outer region or in the inner region of the cell.

To be specific, the allocation controller 30 performs subchannelization using the perfectly-orthogonal channel in the outer region of the cell, and performs subchannelization using the quasi-orthogonal channel in the inner region of the cell.

Here, a "perfectly-orthogonal channel" allocated as a subchannel available in an outer region of a specific cell is configured not to include any subcarriers included in a "perfectly-orthogonal channel" allocated as a subchannel available in an outer region of another cell adjacent to the specific cell.

On the other hand, a "quasi-orthogonal channel" allocated as a subchannel available in an inner region of the specific cell is configured to include some of subcarriers included in a "quasi-orthogonal channel" allocated as a subchannel available in an inner region of another cell adjacent to the specific cell.

Hereinafter, the "perfectly-orthogonal channel" and the "quasi-orthogonal channel" will be described by giving specific examples. In this embodiment, the description will be given by illustrating a radio communication system based on IEEE 802.16 as the radio communication system employing the OFDMA system. However, the present invention is not limited to this radio communication system, and may be applied also to general systems employing the OFDMA system.

In a general radio communication system employing the OFDMA system, a single frequency band is configured of a large number of subcarriers (frequencies). For this reason, it is not efficient to control "which mobile station (user) each subcarrier is to be used for (allocated to)," in terms of the feasibility of the control, as well as in terms of the amount of signals for the control.

Consequently, this radio communication system is configured as follows. A plurality of subcarriers (frequencies) is grouped. Then, the allocation of radio resources (subcarriers) to mobile terminals (users) is performed on a group-by-group basis.

Figure 5:
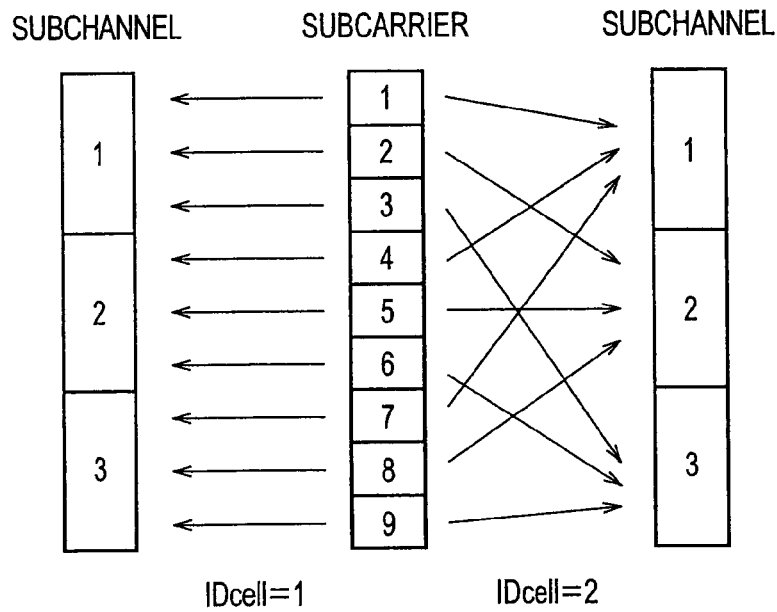
FIG. 5 is a diagram for explaining a concept of subcarriers and subchannels used in radio communication systems according to the first to ninth embodiments.

As shown in FIG. 5, in IEEE 802.16, the group into which plural subcarriers (frequencies) are combined as described above is called a "sub channel."

In addition, the combination pattern of the subchannels is determined in accordance with a parameter called "IDcell."

In the example shown in FIG. 5, in a case where "IDcell=1," a subchannel 1 includes subcarriers 1, 2, and 3; a subchannel 2 includes subcarriers 4, 5, and 6; and a subchannel 3 includes subcarriers 7, 8, and 9.

Further, in a case where "IDcell=2," the subchannel 1 includes subcarriers 1, 4, and 7; the subchannel 2 includes subcarriers 2, 5, and 8; and the subchannel 3 includes subcarriers 3, 6, and 9.

Here, suppose a case where "IDcell" is the same in adjacent cells A and B. When the same subchannel is allocated to both of a mobile terminal A under the cell A and a mobile terminal B under the cell B, all the subcarriers (frequencies) allocated to the mobile terminal A are identical with all the subcarriers allocated to the mobile terminal B.

Suppose again the case where "IDcell" is the same in the adjacent cells A and B. When the different subchannels are allocated respectively to the mobile terminal A under the cell A and the mobile terminal B under the cell B, all the subcarriers (frequencies) allocated to the mobile terminal A are different from all the subcarriers allocated to the mobile terminal B.

Figure 6A:
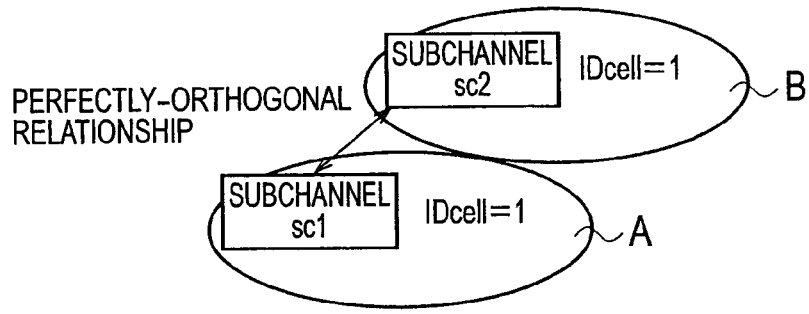
FIG. 6A is a diagram for explaining a concept of a perfectly-orthogonal channel used in the radio communication systems according to the first to ninth embodiments.

For example, as shown in FIG. 6A, in a case where "IDcell" is the same in the adjacent cells A and B, all the subcarriers (frequencies) included in a subchannel sc1 allocated to the mobile terminal A under the cell A are perfectly orthogonal to all the subcarriers (frequencies) included in a subchannel sc2 allocated to the mobile terminal B under the cell B. Accordingly, it can be expressed that, between the cells A and B, subchannelization is implemented by using the "perfectly-orthogonal channel."

In other words, in this case, the perfectly-orthogonal channel sc1 allocated as the subchannel available in the outer region of the cell A is configured not to include any subcarriers included in the perfectly-orthogonal channel sc2 allocated as the subchannel available in the outer region of cell B. Further, the subchannel sc1 and the subchannel sc2 have different subchannel numbers (i.e. sc1 and sc2). In this case, it can be expressed that, the subchannel sc1 is orthogonal to the subchannel sc2.

Figure 6B:
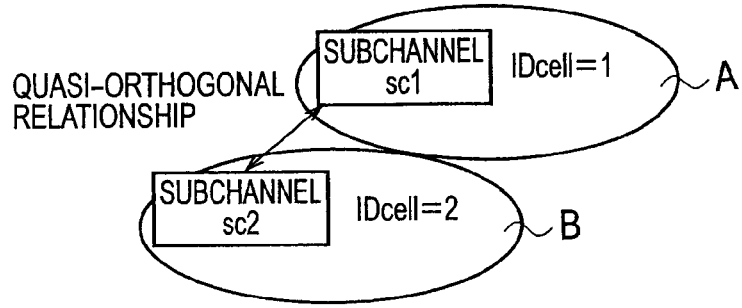
FIG. 6B is a diagram for explaining a concept of a quasi-orthogonal channel used in the radio communication systems according to the first to ninth embodiments.

On the other hand, suppose a case where "IDcell" is different between the adjacent cells A and B as shown in FIG. 6B. In this case, even when the subchannel sc1 allocated to the mobile terminal A under the cell A is different from the subchannel sc2 allocated to the mobile terminal B under the cell B, some of the subcarriers allocated to the mobile terminal A are identical with part of the subcarriers allocated to the mobile terminal B.

For example, in the case where "IDcell" is different between the adjacent cells A and B, an orthogonal relationship is partially established while an quasi-orthogonal relationship is partially established, between the subcarriers (frequencies) included in the subchannel sc1 available in the cell A and the subcarriers (frequencies) included in the subchannel sc2 available in the cell B. Accordingly, these subchannels sc1 and sc2 are called "quasi-orthogonal channels."

In other words, the quasi-orthogonal channel sc1 allocated as the subchannel available in the inner region of the cell A is configured to include some of subcarriers included in the quasi-orthogonal channel sc2 allocated as the subchannel available in the inner region of the cell B, regardless of their subchannel numbers. In this case, it can be expressed that, the subchannel sc1 is quasi-orthogonal to the subchannel sc2.

Figure 7:
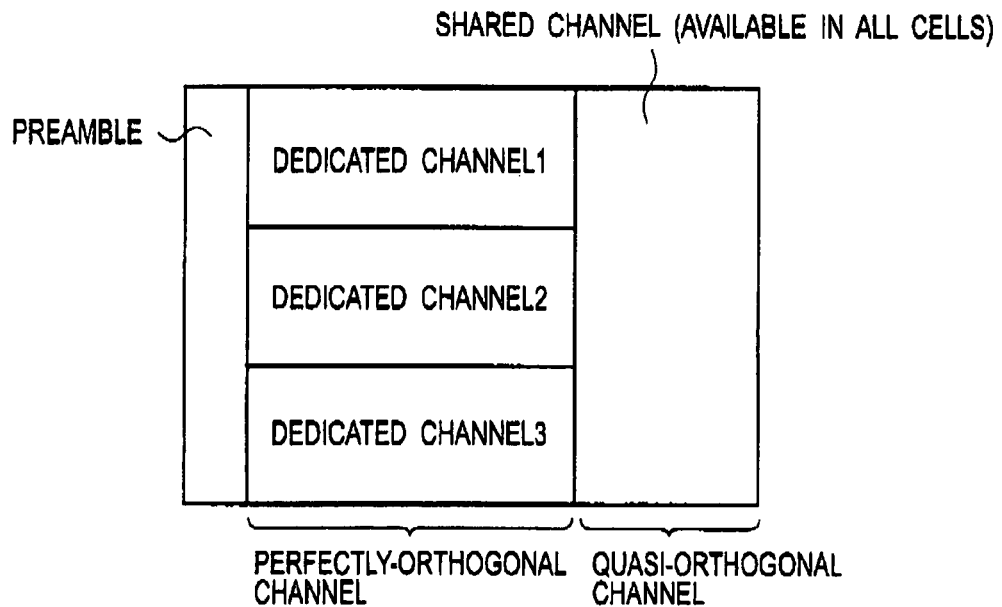
FIG. 7 is a diagram for explaining an example of a data frame structure used in the radio communication system according to the first embodiment.

Alternatively, the allocation controller 30 may be configured to allocate each of the subchannels (perfectly-orthogonal channels) available in the outer regions of cells as a dedicated channel for a corresponding cell, as shown in FIG. 7.

As shown in FIG. 7, for example, the allocation controller 30 can provide a data frame structure in the following manner. Specifically, information on mobile terminals in the outer region of the cell is allocated in a preamble region to which a preamble is allocated, and information on mobile terminals in the inner region of the cell is allocated in a region following the preamble region.

Then, the allocation controller 30 allocates, as the subchannel available in the inner region of the cell, a subchannel corresponding to "IDcell" that is different from "IDcell" of adjacent cells adjacent. Further, the allocation controller 30 allocates, as a subchannel available in the outer region of the cell, a subchannel allocated to the cell of its own, among subchannels corresponding to "IDcell" that is the same as "IDcell" of the adjacent cells.

Here, the allocation controller 30 allocates different subchannels as the subchannels available respectively in the outer region and the inner region of the cell. Alternatively, for example, the allocation controller 30 may be configured to allocate a subchannel available in the outer region to a mobile terminal having a lower reception power of a desired wave than a predetermined threshold, and to allocate a subchannel available in the inner region to a mobile terminal having a higher reception power of a desired wave than the predetermined threshold.

The base station according to the first embodiment is configured to perform subchannelization by using the perfectly-orthogonal channel in the outer region of the cell, and to perform subchannelization by using the quasi-orthogonal channel in the inner region of the cell.

Such a double structure of each cell makes it possible to provide communications with less inter-cell interference in the outer region of the cell, while making it possible to create a condition where MCS (Modulation Code Set) is appropriately selected in the inner region thereof.

The reason why it is made possible to provide communications with less inter-cell interference in the outer region of the cell is that the perfectly-orthogonal channel is used, and also that an appropriate reuse distance is set for each of these subchannels.

On the other hand, the reason why it is made possible to create a condition in which MCS is appropriately selected in the inner region of the cell is as follows.

Conventionally, a base station has determined the transmission power and MCS based on interference level estimated prior to transmitting the data. For this reason, a condition with a large variation in the amount of interference has not been preferable.

Suppose a case where a perfectly-orthogonal channel is allocated to a mobile terminal located in the inner region of the cell. In this case, the amount of interference to the mobile terminal is expected to largely vary in accordance with whether or not the same subchannel is used in adjacent cell of the cell, and further in accordance with which link the subchannel is used by (particularly in the uplink).

By contrast, suppose a case where a quasi-orthogonal channel is allocated to a mobile terminal existing in the inner region of the cell. In this case, the mobile terminal suffers a small amount of interference from every one of subchannels used in adjacent cells of the cell. Accordingly, the variation in the amount of interference to the mobile terminal is eventually made small as a whole, so that it is possible to effectively operate MCS.

Moreover, in a case where subchannels used in one of adjacent cells are not orthogonal to subchannels used in the other, the amount of interference to each mobile terminal becomes larger than that of the case where subchannels used in one of adjacent cells are orthogonal to subchannels used in the other.

For these reasons, the base station according to this embodiment provides the following effects. When subchannels used in the edge between adjacent cells are orthogonal (that is, the perfectly-orthogonal channel is allocated as a subchannel available in the edge between the adjacent cells), it is possible to secure a subchannel with a very small amount of interference. As a result, it is possible to provide favorable communications also, to a mobile terminal far apart from a base station, as well as to a mobile terminal with a low reception power, such as a mobile terminal in door.

In addition, in the base station according to this embodiment, a subchannel available in the outer region of the cell is configured to be allocated to a mobile terminal having a lower reception power than a predetermined threshold, while a subchannel available in the inner region of the cell is configured to be allocated to a mobile terminal having a higher reception power than the predetermined threshold.

The allocation of subchannels as described above makes it possible to obtain the following effects.

In comparison with a case where communications are performed using perfectly-orthogonal channels in the whole regions of all the cells, the beginning and ending of the use of a specific subchannel between adjacent cells do not largely affect the variation in the amount of inter-cell interference to a mobile terminal located in the inner region of the cell. Accordingly, the variation in interference amount can be more easily estimated.

In data communications, the control of transmission power and the selection of MCS are performed based on an estimation of the amount of inter-cell interference. For this reason, a more certain estimation of the amount of inter-cell interference allows these controls to be more effectively performed. As a result, a high system throughput is expected to be obtained.

On the other hand, in comparison with a case where communications are performed using quasi-orthogonal channels in the whole regions of all the cells, the using of perfectly-orthogonal channels in the outer region of the cell makes it possible to provide communications with a less amount of inter-cell interference. In particular, it is possible to reduce an outage rate to a mobile terminal positioned in the edge of the cell.

Moreover, in the base station according to this embodiment, there is more to a simple combination use of a perfectly-orthogonal channel and a quasi-orthogonal channel. In this embodiment, the combination use of a perfectly-orthogonal channel and a quasi-orthogonal channel is based on a concept called "reuse partitioning." Accordingly, it is possible to shorten a substantial reuse distance of subchannels available in a cell, and to thus achieve a high system throughput.

Second Embodiment

Hereinafter, a description will be given of a radio communication system according to this embodiment, focusing mainly on the differences with the radio communication system according to the above-described first embodiment.

Figure 8:
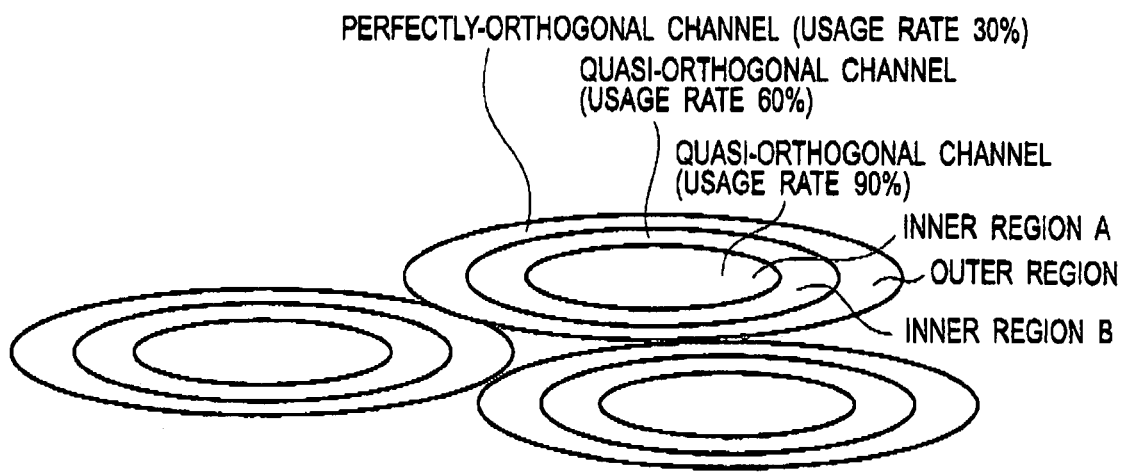
FIG. 8 is a diagram for explaining a method of allocating subchannels in the radio communication system according to the second embodiment.

In the second embodiment of the present invention, as shown in FIG. 8, a cell is divided into a plurality of inner regions and an outer region. An allocation controller 30 is configured to allocate quasi-orthogonal channels with different usage rates as subchannels available respectively in the plurality the inner region.

In this case, the allocation controller 30 sets a region using a quasi-orthogonal channel with a higher usage rate on the inner side than a region using a quasi-orthogonal channel with a lower usage rate.

In the example shown in FIG. 8, the allocation controller 30 allocates a quasi-orthogonal channel with a usage rate of 60% as a subchannel available in an inner region B, while allocating a quasi-orthogonal channel with a usage rate of 90% as a subchannel available in an inner region A.

For example, the allocation controller 30 may be configured to allocate a quasi-orthogonal channel with a higher usage rate to a mobile terminal having a higher reception power.

According to such a configuration, quasi-orthogonal channels with a higher usage rate are effectively used in each cell. As a result, a high system throughput can be achieved.

In addition, the allocation controller 30 can adaptively change the usage rate of a quasi-orthogonal channel available in each region.

For example, the allocation controller 30 may determine a usage rate of a quasi-orthogonal channel available in each region in accordance with blocking rates of adjacent cells using the same frequency band. Alternatively, the allocation controller 30 may determine a usage rate of a quasi-orthogonal channel so as to maximize the area throughput in accordance with the parameters used in the adjacent cells, and with measured observation information thereof.

Moreover, the allocation controller 30 may set a plurality of perfectly-orthogonal channels with different reuse distances.

Third Embodiment

Hereinafter, a description will be given of a radio communication system according to this embodiment, focusing mainly on the differences with the radio communication systems according respectively to the above-described first and second embodiments.

As described above, in the first and second embodiments, the allocation controller 30 is configured to allocate fixed amount of subchannels as for the resources used in the outer region of each cell to the cells.

In this case, although an operation with an easy control can be achieved, there is a possibility that a large number of mobile terminals cannot obtain sufficient transmission rates in a cell with a high traffic in a case where a specific cell has a large number of unused subchannels with a low traffic while an adjacent cell has insufficient subchannels with a high traffic. This is because radio resources are restricted more than necessary even while a higher system throughput can be achieved by allowing these unused subchannels in the specific cell to be used in other cells.

On the other hand, when these subchannels are permitted to be used in other cells, there is a possibility that mobile terminals located in the edge of the cell cannot use these subchannels to establish communications, due to the interferences from the other cells.

For these reasons, it is preferable to share a quasi-dedicated channel between the cells, without affecting the outage rates of mobile terminals located in the edge of a cell.

Figure 9:
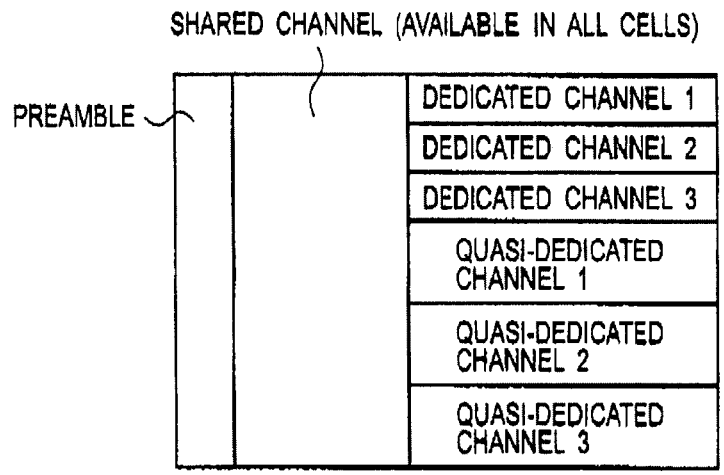
FIG. 9 is a diagram for explaining an example of a data frame structure used in the radio communication system according to the third embodiment.

Consequently, in the third embodiment, when allocating a perfectly-orthogonal channel as a subchannel available in each cell, the allocation controller 30 is configured to allocate the perfectly-orthogonal channel by classifying the perfectly-orthogonal channel into a dedicated channel or a quasi-dedicated channel, as shown in FIG. 9.

Here, the dedicated channel is a subchannel that is dedicatedly allocated in each cell, while the quasi-dedicated channel is a subchannel that is shared by a plurality of cells under certain conditions.

Specifically, the allocation controller 30 is configured to allocate subchannels to mobile terminals in the following order of priority in principle: firstly, a "dedicated channel allocated as a subchannel (perfectly-orthogonal channel) available in its own cell then, a "quasi-dedicated channel allocated as a subchannel (perfectly-orthogonal channel) available in its own cell," and lastly, a "quasi-dedicated channel allocated as a subchannel (perfectly-orthogonal channel) available in other cells;".

Then, when the allocation controller 30 has allocated to mobile terminals all the "dedicated channels allocated as subchannels (perfectly-orthogonal channels) available in its cell," the allocation controller 30 prohibits other cells from using the "quasi-dedicated channels allocated as subchannels (perfectly-orthogonal channels) available in its own cell."

As a result, the blocking rate in each cell can be reduced.

Figure 10:
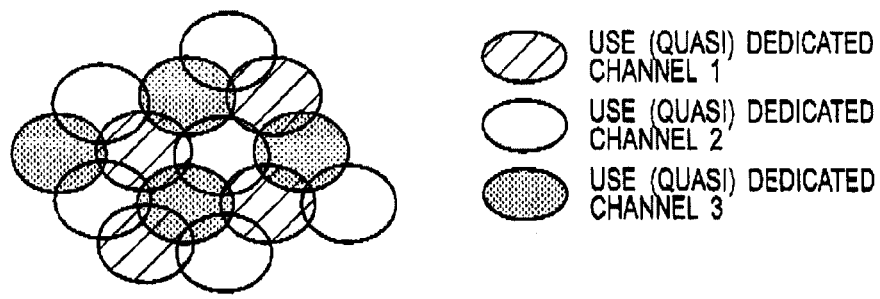
FIG. 10 is a diagram showing an example of a cell configuration in the radio communication system according to the third embodiment.

FIG. 10 shows an example where the allocation controller 30 allocates the "dedicated channel" and the "quasi-dedicated channel" in each cell. In the example shown in FIG. 10, the allocation controller 30 is configured to allocate different channels, that is, "dedicated channel" and "quasi-dedicated channel" as subchannels (perfectly-orthogonal channels) available respectively in the adjacent cells.

In addition, the allocation controller 30 may be configured to permit and prohibit the use of the quasi-dedicated channels through a wired network.

Moreover, the allocation controller 30 may be configured to preferably allocate a quasi-dedicated channel allocated as a subchannel available in a cell with a lower traffic load in its perfectly-orthogonal channel.

Here, the allocation controller 30 may be configured to find the traffic load through a wired network.

Moreover, the allocation controller 30 may set higher allocation thresholds of the "quasi-dedicated channels" in the other cells, as a method of managing the "quasi-dedicated channels" and the "dedicated channels."

Here, the allocation controller 30 may be configured to use, as a reference for allocating the "quasi-dedicated channels," the reception power ratio for the interference level of the whole of the quasi-dedicated channels.

Alternatively, the allocation controller 30 may be configured to determine the allocation threshold of the quasi-dedicated channel in a specific cell 1 in accordance with the interference level of the dedicated channel in the cell 1.

Moreover, the allocation controller 30 may be configured to monitor a condition of its own cell on a data frame basis, and to be prohibited from allocating the "quasi-dedicated channel" upon occurrence of a state where the condition in the cell exceeds the allocation threshold (this does not mean that, once allocated, the "quasi-dedicated channel" can be continuously used).

As a result, when the traffic load is low in its own cell, the allocation controller 30 allocates the "quasi-dedicated channel" as a subchannel available in a cell with a high traffic load. When the traffic load is increased in each cell, the inter-cell interference level is also increased. Eventually, in each cell, it becomes difficult to use the "quasi-dedicated channel" allocated as a subchannel available in the other cells.

Figure 11:
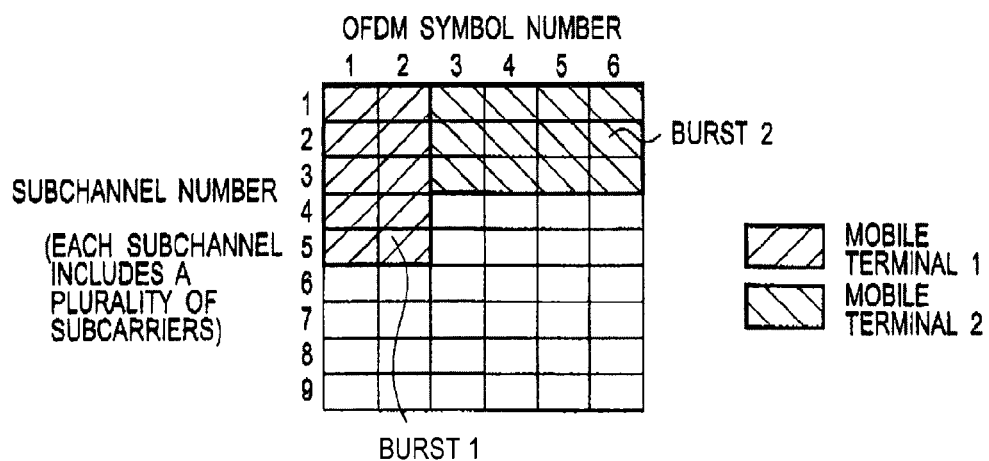
FIG. 11 is a diagram showing a first example of a burst allocation pattern used in the radio communication system according to the third embodiment.

In addition, in the downlink specified by IEEE 802.16, the allocation controller 30 is configured, as shown in FIG. 11, to allocate a radio resource to the mobile terminal located in each cell by using a burst allocation pattern defined by a combination of at least one subchannel (a subchannel number) and at least one symbol (OFDM symbol number, corresponding to an allocation time for the subchannel) in a data frame structure.

Such an allocation unit of the radio resource to the mobile terminal is called a "burst," In a case where the "quasi-dedicated channel" is allocated as a subchannel available in each cell, the burst allocation pattern is same for all the cells.

Figure 12:
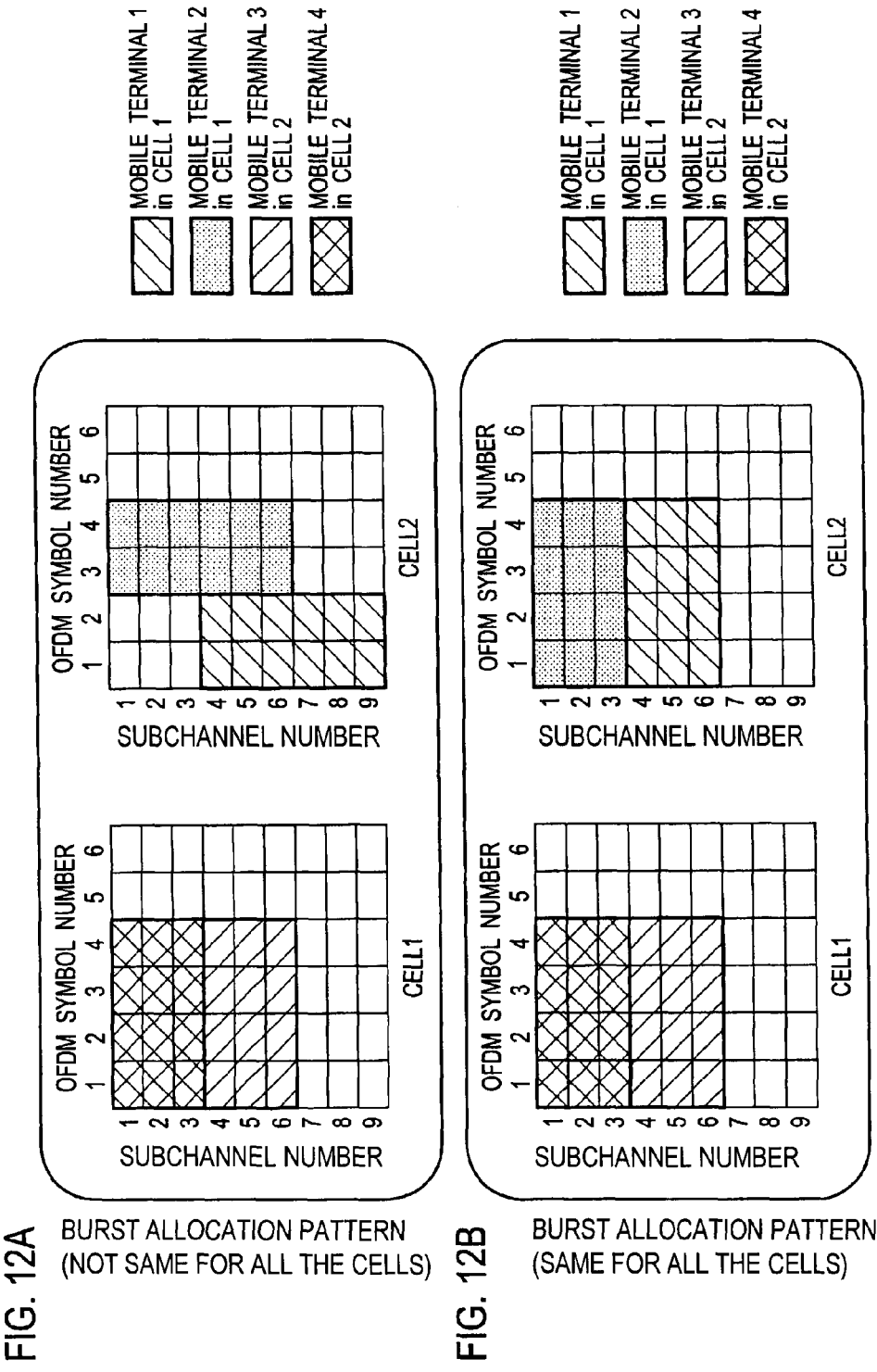
FIG. 12A is a diagram showing a second example of the burst allocation pattern used in the radio communication system according to the third embodiment.
FIG. 12B is another diagram showing the second example of the burst allocation pattern used in the radio communication system according to the third embodiment.

This is because of the following reason. Suppose a case where burst allocation patterns are not same for all the cells as shown in FIG. 12A. In this case, even when the orthogonalization is attempted on a subchannel-by-subchannel basis, there is no assurance, in terms of each burst, that subchannels available respectively in adjacent cells are orthogonalized.

On the other hand, suppose a case where burst allocation patterns are same for all the cells as shown in FIG. 12B. In this case, subchannels available respectively in adjacent cells are orthogonalized even in terms of each burst.

Fourth Embodiment

Hereinafter, a description will be given of a radio communication system according to this embodiment, focusing mainly on the differences with the radio communication systems according respectively to the above-described first to third embodiments.

In the above-described first to third embodiments, the allocation controller 30 is configured to allocate a subchannel available in the inner region or the outer region of the cell, based on the reception powers or the like of mobile terminals.

This configuration conceptually means that a subchannel to be allocated to a mobile terminal is determined in accordance with the location of the mobile terminal in the cell.

However, the location of a mobile terminal transmitting and receiving a handover call (mobile terminal moving at a high speed) changes at every moment.

For this reason, the system throughput is expected to be affected largely by the amount of interference to the mobile terminal moving at a high speed itself, or by the amount of interference in the surroundings caused by the movement of the mobile terminal moving at a high speed.

Consequently, in this embodiment, an allocation controller 30 is configured to allocate a subchannel available in either the inner region or the outer region of the cell by using not only the reception power of a mobile terminal but also information on the moving speed of the mobile terminal.

Shown below is a method of allocating a subchannel for a call. The handover call mentioned here include a call transmitted and received by a mobile terminal moving at a high speed, in addition to a call transmitted and received by a mobile terminal that has come from the outside of the cell by handover.

Alternatively, the allocation controller 30 may be configured to allocate a handover call to a subchannel available in the outer region of the cell.

Figure 13:
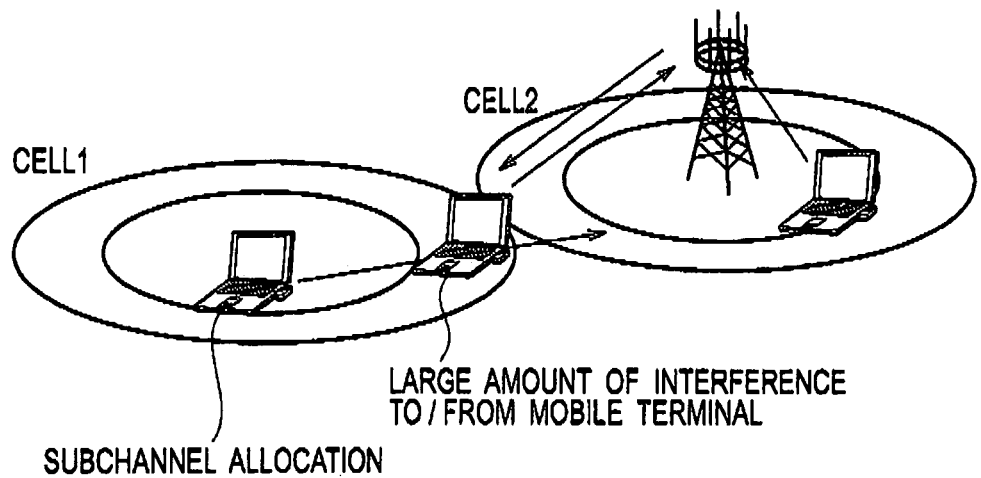
FIG. 13 is a diagram for explaining the operation of a mobile terminal at the time of handover in the radio communication system according to a fourth embodiment.

As shown in FIG. 13, statistically, a subchannel available in the inner region of the cell is likely to receive a large interference power from the edge of the cell. For this reason, the subchannel is likely to be cut off when the mobile terminal moves to the edge of the cell. Accordingly, there is a high possibility that the subchannels are switched.

In addition, the switching of subchannels requires the searching of subchannels and the exchanging of control signals.

Moreover, when the frequency of switching subchannels is high, the variation in inter-cell interference becomes large, making it difficult to estimate the amount of interference.

Furthermore, particularly in the uplink, such a high frequency of switching subchannels increases the amount of interference to a mobile terminal located near edge of an adjacent cell. The increase largely affects the deterioration in the system throughput.

For these reasons, in a case where the allocation controller 30 does not provide a subchannel dedicated to a handover call, the allocation controller 30 preferably allocates the handover call to a subchannel available in the outer region of the cell.

Alternatively, while the cell is divided into the plurality of inner regions and the outer region, the allocation controller 30 may be configured to allocate the handover call to a subchannel available in one of the plurality of inner regions.

In this case, when the amount of interference to a mobile terminal, or the amount of interference in other cells caused by the mobile terminal, becomes larger than the predetermined threshold, it is preferable that the allocation controller 30 use a quasi-orthogonal channel that is independent from the usage status of subchannels in adjacent cells.

In the above-described example, the description has been given of the system in which the allocation controller 30 does not provide a subchannel dedicated to the handover call. In this system, it is possible to easily control the allocation.

On the other hand, in the above-described example, the allocation controller 30 allocates, to the handover call, a subchannel available in the outer region of the cell. Accordingly, in a case, for example, where the number of handover calls is large, the quality of communications that can be provided to a mobile terminal located in the edge of the cell may possibly be significantly deteriorated.

Consequently, the following method can be employed. Specifically, the cell is divided into the plurality of inner regions and the outer region. Then, a subchannel available in part of the plural sections of the inner region is used as a subchannel dedicated to the handover call.

However, in a case where there is no handover call while a specific subchannel is used as the subchannel dedicated to the handover call, the specific subchannel (radio resource) cannot be effectively utilized. For this reason, the specific subchannel is normally used as a shared channel with a low usage rate.

In addition, the allocation controller 30 may adaptively vary the rate of allocating the specific subchannel to the handover call in accordance with the status of handover calls in its own cell and surrounding cells.

Specifically, the allocation controller 30 controls the rate of allocating the specific subchannel in the following manner. The rate of allocating the specific subchannel to signals other than handover calls is decreased when there are a large number of handover calls, while the rate of allocating the specific subchannel to signals other than handover calls is increased when there are only a small number of handover calls.

Moreover, the allocation controller 30 may be configured to determine the rate of allocating the specific subchannel by taking into consideration also the amount of traffic in each cell.

Furthermore, even when a subchannel dedicated to the handover call is provided, the allocation controller 30 may be configured to allocate, to the handover call, a subchannel other than the subchannel dedicated to the handover call.

In this case, the allocation controller 30 may be configured to determine which subchannel (the subchannel dedicated to the handover call or the subchannel other than the subchannel dedicated to the handover call) is used for the handover call based on the current occupancy of the handover call or the current reception power of the handover call in the inner region of each cell.

In addition, in the above-described embodiment, as to the position, in the data frame structure, of a subchannel to be allocated to the handover call, any position may be employed in principle without causing any fatal problem.

In WiMAX, known signals are distributed over, a preamble region to which a preamble is allocated in the front of the data frame structure, and a region to which data are allocated.

Then, the known signals are utilized for establishing time synchronization and frequency synchronization, as well as for performing channel estimation.

When a mobile terminal is moving at a high speed, the rate of channel variation for the time passage is also high. For this reason, when a radio resource (a radio resource for transmitting and receiving the handover call (a subchannel and an OFDM symbol)) used by the mobile terminal is allocated to a region temporally away from the preamble region to which the preamble is allocated, the preamble cannot be effectively utilized. Accordingly, this is considered to be likely to lead to deterioration in reception quality.

In this respect, in this embodiment, the allocation controller 30 determines a region to which the handover call is allocated in the data frame structure as described below.

For example, as shown in FIG. 7, the allocation controller 30 provides a data frame structure in the following manner. Specifically, in the data frame structure, information on a mobile terminal located near edge of the cell and information on a mobile terminal performing handover are allocated to a first region following a preamble region to which the preamble is allocated. Then, information on a mobile terminal located in a vicinity of the cell is allocated to in a second region following the first region.

As described above, it is preferable to allocate a handover call to a region in a data frame structure, the region being close to the preamble region to which the preamble is allocated.

A mobile terminal moving at a high speed has a large channel variation for the time passage. Accordingly, when a radio resource (a radio resource for transmitting and receiving handover calls) that can be used by the mobile terminal is allocated to a rear part of the data frame structure, the amount of variation between the subchannel estimated in the preamble and the subchannel in the region to which the handover call is allocated becomes large. For this reason, it is difficult to effectively utilize a channel estimation value obtained by using the preamble.

On the other hand, when a mobile terminal is not moving, the rate of channel variation for the time passage is small. Accordingly, even in a case where a radio resource that can be used by the mobile terminal is allocated to a region in a rear part of the data frame structure, it is possible to obtain a channel estimation value by effectively utilizing the preamble.

As a result, it is possible to allow all the mobile terminals to obtain channel estimation values with high channel estimation accuracies, by allocating a handover call to a region near a preamble region to which a preamble is allocated, and by then allocating, to a region following the preamble region, a radio resource that can be used by a mobile terminal (fixed terminal) that is not moving.

Fifth Embodiment

Hereinafter, a description will be given of a radio communication system according to this embodiment, focusing mainly on the differences with the radio communication systems according respectively to the above-described first to fourth embodiments.

In the above-described first to fourth embodiments, the descriptions have been given of a method of using a subchannel in each cell. In each cell, communications, which are transmitted and received by a plural of mobile terminals, are generally multiplexed.

In the fifth embodiment of the present invention, a description will be given of methods of multiplexing communications, transmitted and received by the plurality of mobile terminals, by giving an essential example shown in FIG. 14.

Figure 14:
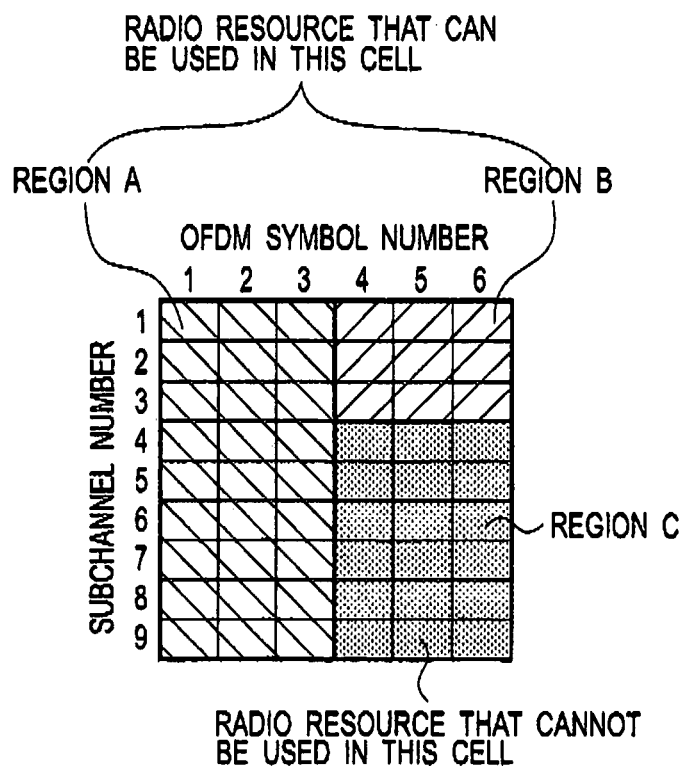
FIG. 14 is a diagram showing a first example of a burst allocation pattern used in the radio communication system according to the fifth embodiment.

As a first method, the allocation controller 30 may provide a data frame structure in which regions A, B and C are included, as shown in FIG. 14. Here, the region A has a size that is fixed in advance, and is a region for allocating a radio resource available in the outer region of the cell. The region B is a region for allocating a radio resource available in the inner region of the cell. The region C is a region for allocating a radio resource that cannot be used in its own cell in order to reduce the amount of interference to other cells and to reduce the usage rate of subchannels in its own cell.

Figure 15:
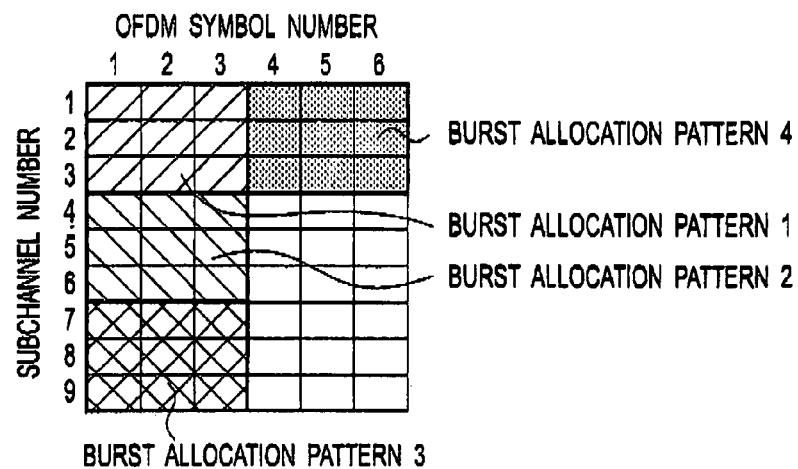
FIG. 15 is a diagram showing a second example of the burst allocation pattern used in the radio communication system according to the fifth embodiment.

In this case, as shown in FIG. 15, the allocation controller 30 checks whether or not a radio resource (a subchannel and a OFDM symbol) can be allocated to a mobile terminal located in each cell by using burst allocation patterns 1 to 4 in this order, so as to allocate the radio resource in accordance with the burst allocation pattern that firstly enables the allocation.

Here, the allocation controller 30 determines whether or not the radio resource can be allocated in accordance with the usage statuses of other mobile terminals in each cell, reception powers, and SINRs.

In addition, suppose a case, for example, where a mobile terminal to which a radio resource is to be allocated is requiring a very high transmission rate while the amount of traffic in each cell is small. For such a case, the allocation controller 30 may be configured to allocate radio resources (radio resources corresponding to a plurality of bursts) by using a plurality of burst allocation patterns.

At this time, the allocation controller 30 preferably allocates radio resources corresponding to contiguous regions (bursts) in the data frame structure.

Figure 16A:
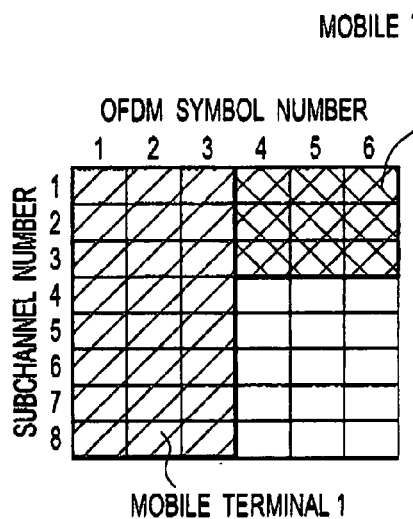
FIG. 16A is a diagram showing a third example of the burst allocation pattern used in the radio communication system according to the fifth embodiment.
Figure 16B:
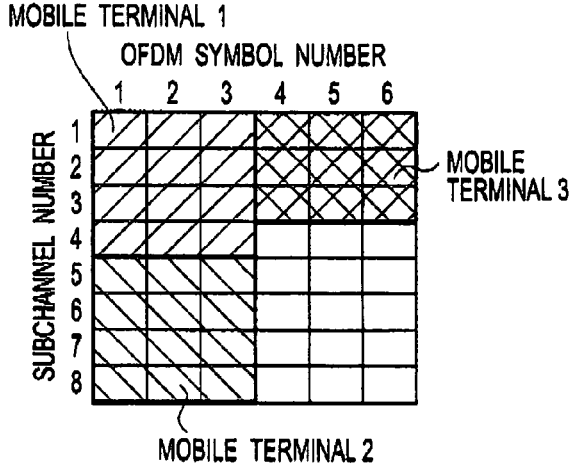
FIG. 16B is another diagram showing the third example of the burst allocation pattern used in the radio communication system according to the fifth embodiment.

As a second method, as shown in FIGS. 16A and 16B, the allocation controller 30 may provide a data frame structure in which the above-described regions (bursts) are divided for use in accordance with an increase in the number of mobile terminals existing in each cell.

In this case, the allocation controller 30 determines which region (burst) is allocated to specific mobile terminals.

The allocation controller 30 is configured to equally divide the region (burst) in accordance with the number of the specific mobile terminals to which radio resources corresponding to the region are allocated, or to divide the region in accordance with the transmission rate required by each mobile terminal. The allocation controller 30 is further configured to thus allocate, to the respective mobile terminals, radio resources corresponding to the divided regions.

In this allocation method, the statuses of other mobile terminals in the cell needs to be taken into account when the allocation controller 30 determines a region for allocating radio resources to be used by each mobile terminal, particularly in a case where plurality of regions, to which radio resources that can be used in the inner region of the cell are allocated, are provided.

Specifically, the allocation controller 30 may be configured to allocate, to each region, radio resources to be used by the equal number of (or a prescribed ratio of) mobile terminals. In other words, the allocation controller 30 may be configured to allocate, to a region with a higher usage rate, radio resources to be used by a mobile terminal having a higher reception power, or by a mobile terminal having a higher value of (CINR—required quality).

In this case, the allocation controller 30 may set in advance the maximum number of multiplexing mobile terminals that can be allocated at once in each region (burst).

Sixth Embodiment

Hereinafter, a description will be given of a radio communication system according to this embodiment, focusing mainly on the differences with the radio communication systems according respectively to the above-described first to fifth embodiments.

In the above-described first to fifth embodiments, since a mobile terminal is on the receiving side in the downlink, the base station cannot directly monitor SINR (in particular, the amount of interference).

Accordingly, the base station needs to obtain, or estimate, the amount of interference to the mobile terminal.

Specifically, the allocation controller 30 may allocate, in accordance with the reception power or the interference power in the uplink, a radio resource (a subchannel and an OFDM symbol) available in the inner region or the outer region of the cell, as a radio resource (a subchannel and an OFDM symbol) available in a mobile terminal.

On the other hand, the allocation controller 30 may let a mobile terminal report the communication quality in the downlink by using a specific format.

In addition, the allocation controller 30 may be configured: to determine candidates for the subchannel to be allocated to a mobile terminal, in accordance with the reception power in the uplink; and to request the mobile terminal to measure and report the communication qualities, such as CQI (Channel Quality Indicator) information, for these candidates; and to thus allocate a subchannel of the candidates in accordance with the reported CQI information.

At this time, it is considered that the communication qualities according respectively to the radio resources available in the inner region of the cell are uniform in the inner region. Accordingly, there is no need for measuring the communication quality (the state of the channel) for each of the subchannels available in the inner region.

In addition, in the above-described example, the description has been given of the method with which the base station estimates the communication quality, or the method with which the base station acquires the communication quality by using the dedicated control signal.

In IEEE 802.16, a mobile terminal is configured to transmit a CDMA code when performing an initial request for using a frequency band. At this time, the CDMA code to be transmitted is selected at random from a plurality of codes that are prepared in advance.

Moreover, the mobile terminal is configured to periodically transmit a CDMA code to adjust the transmission timing, the transmission power, and the frequency offset, even when not transmitting data.

At this time, the CDMA code to be transmitted is selected randomly from a plurality of codes that are prepared in advance (, which are different from the aforementioned codes for performing an initial request for using a frequency band).

In addition, the allocation controller 30 further divides sets of the CDMA codes that are prepared in advance into a plurality of groups. The allocation controller 30 then associates each of the plurality of groups with a desired subchannel, or the type of subchannel (the perfectly-orthogonal channel and the quasi-orthogonal channel).

Then, the allocation controller 30 selects a desired subchannel in accordance with the reception power or the interference on the mobile terminal side, and then transmits a code corresponding to the desired subchannel.

Using a ranging code as described above makes it possible to transmit CQI information without separately preparing a control channel for transmitting the CQI information.

Seventh Embodiment

Hereinafter, a description will be given of a radio communication system according to this embodiment, focusing mainly on the differences with the radio communication systems according respectively to the above-described first to sixth embodiments.

In the above-described first to sixth embodiments, the descriptions have been given of the example where a plurality of base stations in the same radio communication system perform communications using subcarriers (frequencies) in a specific frequency band. By contrast, in the seventh embodiment, as shown in FIG. 17, base stations A and B belongs to different radio communication systems A and B respectively which are configured to perform communications by using subcarriers in the same frequency band.

Here, suppose a case where the plurality of base stations in the radio communication system performs communications by using subcarriers in a specific frequency band. In this case, the central control in the radio communication system easily makes it possible to set, in data frame structures used respectively by these base stations, the same arrangement of regions to which perfectly-orthogonal channels are allocated and regions to which quasi-orthogonal channels are allocated.

By contrast, suppose a case where, as in the case of this embodiment, the base stations A and B respectively in the different radio communication systems A and B perform communications by using subcarriers (frequencies) in the same frequency band. In this case, as shown in FIG. 18A, since it is difficult to set, in the data frame structure used by the base station A and in the data frame structure used by the base station B, the same arrangement of regions to which perfectly-orthogonal channels are allocated and of regions to which quasi-orthogonal channels are allocated. This is because the operators of the respective radio communication systems are different. For this reason, there is a possibility that the effects of the present invention are decreased.

For the purpose of solving this problem, in this embodiment, the allocation controller 30 is configured to determine, by means of the following methods, the arrangement of regions to which perfectly-orthogonal channels are allocated and regions to which quasi-orthogonal channels are allocated.

As a first method, the allocation controller 30 may be configured to determine the arrangement (burst allocation pattern) in accordance with the number of radio communication systems co-existing in each area.

Specifically, the allocation controller 30 may be configured to set, in advance, a correspondence relationship between the number of radio communication systems co-existing in each area and the above-described arrangement (ratio between regions to which perfectly-orthogonal channels are allocated and regions to which quasi-orthogonal channels are allocated). Then, the allocation controller 30 thus determines the arrangement by using the correspondence relationship.

Here, the allocation controller 30 may be configured to obtain the number of radio communication systems co-existing in each area in accordance with the propagation condition in the environment. Alternatively, the allocation controller 30 may be configured to obtain the number of radio communication systems co-existing in each area by performing communications via a common control channel with a base station in another radio communication system.

As a second method, the allocation controller 30 may be configured to determine the arrangement of its own so that the arrangement in a radio communication system having a smaller ratio of regions to which perfectly-orthogonal channels are allocated can be identical with the arrangement in a radio communication system having a larger ratio of regions to which perfectly-orthogonal channels are allocated.

Eighth Embodiment

Hereinafter, a description will be given of a radio communication system according to this embodiment, focusing mainly on the differences with the radio communication systems according respectively to the above-described first to seventh embodiments.

In a radio communication system with a network deployed in an area, a factor limiting the coverage of a cell is the receivable distance of a broadcast signal.

For this reason, in general radio communication systems with networks deployed in corresponding areas, the interference between the base stations A and B respectively in different radio communication systems A and B is taken into consideration. Upon the consideration, the arrangement of base stations, the allocation of subchannels, and the determination of transmission parameters of broadcast signals, are carried out so that the broadcast signals can be received at all the points within the assumed coverage area.

Accordingly, it is preferable that these broadcast signals are transmitted by using a perfectly-orthogonal channel by which subchannels with low interference levels can be easily obtained.

Moreover, the following problem arises in the case where base stations in different radio communication systems perform communications by using subcarriers (frequencies) in a specific frequency band, in contrast to the case where base stations in the same radio communication system perform communications by using subcarriers (frequencies) in a specific frequency band. Specifically, it is difficult to previously estimate the amount of interference from other base stations, and to thus perform the arrangement of base stations, the allocation of subchannels, and the determination of transmission parameters of broadcast signals.

For this reason, the allocation controller 30 is configured to perform the allocation of subchannels for broadcast signals by means of the following method.

As a first method, the allocation controller 30 may be configured to allocate at least one broadcast signal to a subchannel available in the outer region of each cell.

Figure 19:
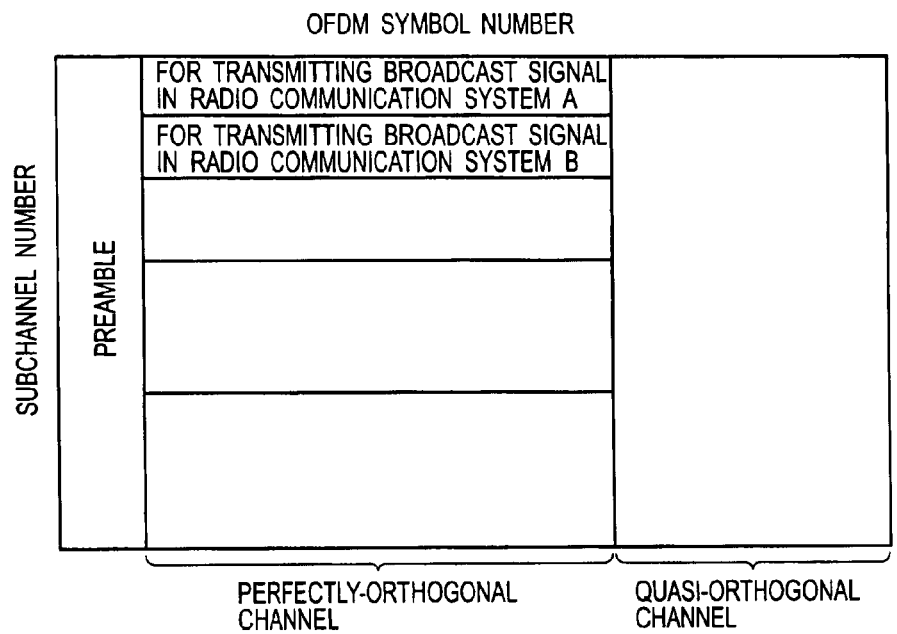
FIG. 19 is a diagram for explaining an example of a data frame structure used in the radio communication system according to the eighth embodiment.

For example, as shown in FIG. 19, the allocation controller 30 of the base station A allocates a radio resource corresponding to a region to which a perfectly-orthogonal channel is allocated, as a radio resource for transmitting a broadcast signal in the radio communication system A. Meanwhile, the allocation controller 30 of the base station B allocates a radio resource corresponding to a region to which a perfectly-orthogonal channel is allocated, as a radio resource for transmitting a broadcast signal in the radio communication system B.

As a second method, the allocation controller 30 may be configured to allocate some of subchannels available in the outer region of each cell exclusively for the purpose of transmitting the broadcast signals.

Specifically, the allocation controller 30 of each radio communication system recognizes a perfectly-orthogonal channel that is used as a control channel so as not to use the perfectly-orthogonal channel for the purpose of data transmission.

Note that, the allocation controller 30 of each radio communication system may be configured to recognize the perfectly-orthogonal channel used as the control channel by utilizing the surrounding base stations in the same radio communication system.

Ninth Embodiment

Hereinafter, a description will be given of a radio communication system according to this embodiment, focusing mainly the differences with the radio communication systems according respectively to the above-described first to eighth embodiments.

In the radio communication systems according to the above-described first to eighth embodiments, the allocation controller 30 is configured to separate, in the data frame structure, the region to which the perfectly-orthogonal channel is allocated and the region to which the quasi-orthogonal channel is allocated, according to the time axis (the direction in which the OFDM symbols are arranged) (see FIGS. 7, 19 and the like).

Figure 20:
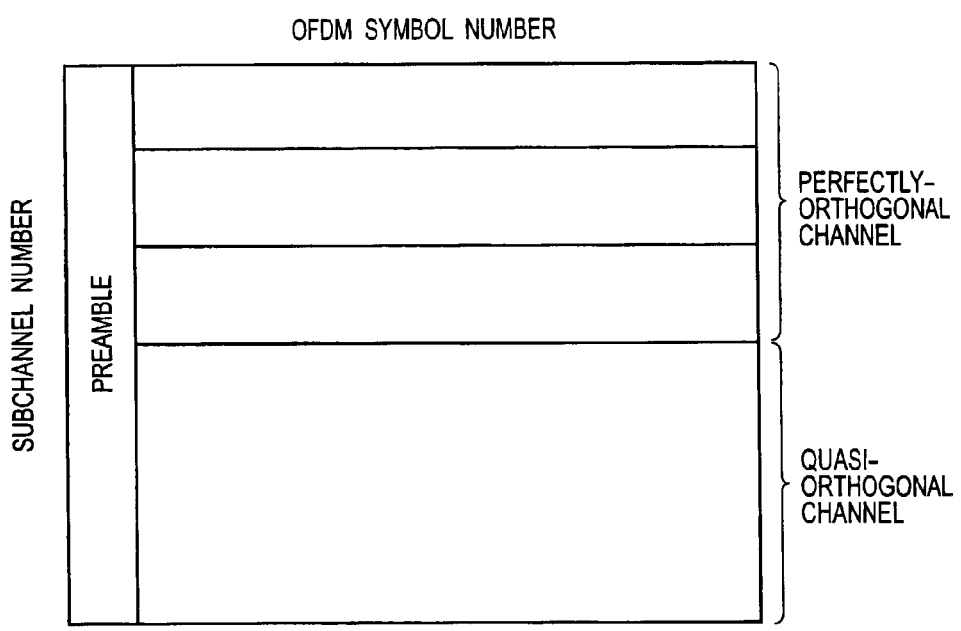
FIG. 20 is a diagram for explaining an example of a data frame structure used in the radio communication system according to the ninth embodiment.

By contrast, in the radio communication system according to this embodiment, as shown in FIG. 20, the allocation controller 30 is configured to separate, in the data frame structure, the region to which the perfectly-orthogonal channel is allocated and the region to which the quasi-orthogonal channel is allocated, according to the frequency axis (the direction in which subchannels are arranged).

This embodiment is applicable in a case where base stations of different radio communication systems perform communications by using subcarriers (frequencies) in a specific frequency band, and also applicable in a case where base stations in the same radio communication system perform communications by using subcarriers (frequencies) in a specific frequency band.

Other Embodiments

Although the present invention has been described so far by giving the above-described embodiments, it should not be understood that any statement and drawing constituting a part of this disclosure limits the present invention. On the basis of this disclosure, various alternative embodiments, examples, and operational techniques will be apparent to those skilled in the art.

For example, in these embodiments, the descriptions have been given by taking the base station as an example of a radio communication apparatus including the allocation controller 30. The radio communication apparatus including the allocation controller 30 may not be settled in a base station but in the network side, such as an exchange, and a radio network controller configured to control a base station.

Although the present invention has been described in detail so far by using the above-described embodiments, it is obvious to those skilled in the art that the present invention is not limited to these embodiments described in the specification. The present invention may be implemented as an embodiment with modification or change without departing from the spirit and scope of the invention defined in the descriptions in the scope of claims. Accordingly, the descriptions in this specification have been given for illustrative description, and thus should not be construed as any limitation to the present invention.

What is claimed is:

1. A radio communication apparatus used in a radio communication system configured to implement a frequency division multiple access method by using a frequency division multiplexing method as a modulation method and to divide each cell into at least one inner region and an outer region, the radio communication apparatus comprising:
an allocation controller configured to allocate a perfectly-orthogonal channel as a subchannel available in the outer region, and to allocate a quasi-orthogonal channel as a subchannel available in the inner region, wherein
the subchannels are groups into which a plurality of subcarriers are combined, and
the allocation controller is configured to
constitute a plurality of patterns as a combination pattern of the subchannels,
perform subchannelization using the quasi-orthogonal channel which is configured to include some of subcarriers used in adjacent cells by allocating subchannels corresponding to different patterns from adjacent cells as an available subchannel in the inner region, and
perform subchannelization using the perfectly-orthogonal channel which is configured not to include any subcarriers used in adjacent cells by allocating subchannels corresponding to the same pattern as adjacent cells as an available subchannel in the outer region.

2. The radio communication apparatus according to claim 1, wherein
the allocation controller is configured to allocate the subchannel available in the outer region to a mobile terminal having a lower reception power of a desired wave than a predetermined threshold, and to allocate the subchannel available in the inner region to a mobile terminal having a higher reception power of the desired wave than the predetermined threshold.

3. The radio communication apparatus according to claim 1, wherein
each cell is divided into a plurality of inner regions and the outer region, and
the allocation controller is configured to allocate quasi-orthogonal channels having different usage rates as subchannels which are available respectively in the plurality of inner regions.

4. The radio communication apparatus according to claim 1, wherein
the allocation controller is configured to allocate a radio resource to a mobile terminal located in the outer region of the each cell by using a burst allocation pattern defined by a combination of at least one perfectly-orthogonal channel and at least one symbol in a data frame structure, and
the burst allocation pattern is identical in the each cell.

5. The radio communication apparatus according to claim 1, wherein
the allocation controller is configured to allocate a handover call to the subchannel available in the outer region.

6. The radio communication apparatus according to claim 1, wherein
each cell is divided into a plurality of inner regions and the outer region, and
the allocation controller is configured to allocate a handover call to a subchannel available in one of the plurality of inner regions.

7. The radio communication apparatus according to claim 5 or 6, wherein
the allocation controller is configured to allocate the handover call to a region in a data frame structure, the region being close to a preamble region to which a preamble is allocated.

8. The radio communication apparatus according to claim 1, wherein the allocation controller is configured to allocate the subchannel available in either the inner region or the outer region to a mobile terminal, in accordance with a communication quality in a downlink, the communication quality being notified by the mobile terminal.

9. The radio communication apparatus according to claim 1, wherein
the allocation controller is configured to allocate a radio resource to a mobile terminal located in the outer region of the each cell by using a burst allocation pattern defined by a combination of at least one perfectly-orthogonal channel and at least one symbol in a data frame structure, and
the allocation controller is configured to change the burst allocation pattern in accordance with a propagation condition.

10. The radio communication apparatus according to claim 1 wherein
the allocation controller is configured to exclusively allocate some subchannels available in the outer region for transmitting a broadcast signal.

11. A radio communication method in a radio communication system configured to implement a frequency division multiple access method by using a frequency division multiplexing method as a modulation method, and to divide each cell into at least one inner region and an outer region, the radio communication method comprising:
allocating, at a radio communication apparatus, a perfectly-orthogonal channel as a subchannel available in the outer region, and allocating a quasi-orthogonal channel as a subchannel available in the inner region, wherein
the subchannels are groups into which a plurality of subcarriers are combined, and
the allocating includes
constituting a plurality of patterns as a combination pattern of the subchannels.
performing subchannelization using the quasi-orthogonal channel which is configured to include some of subcarriers used in adjacent cells by allocating subchannels corresponding to different patterns from adjacent cells as an available subchannel in the inner region, and
perform subchannelization using the perfectly-orthogonal channel which is configured not to include any subcarriers used in adjacent cells by allocating subchannels corresponding to the same pattern as adjacent cells as an available subchannel in the outer region.

* * * * *